United States Patent
Groshek

(10) Patent No.: US 10,240,840 B2
(45) Date of Patent: Mar. 26, 2019

(54) SCROLL UNLOADING DETECTION SYSTEM

(71) Applicant: Emerson Climate Technologies, Inc., Sidney, OH (US)

(72) Inventor: Jacob A. Groshek, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 15/848,063

(22) Filed: Dec. 20, 2017

(65) Prior Publication Data

US 2018/0180339 A1 Jun. 28, 2018

Related U.S. Application Data

(60) Provisional application No. 62/438,084, filed on Dec. 22, 2016.

(51) Int. Cl.
*F25B 49/02* (2006.01)
*F04C 18/04* (2006.01)
(Continued)

(52) U.S. Cl.
CPC .......... *F25B 49/022* (2013.01); *F01C 1/0207* (2013.01); *F01C 1/0215* (2013.01);
(Continued)

(58) Field of Classification Search
CPC .... F01C 1/0207; F01C 1/0215; F01C 1/0223; F04C 18/0207; F04C 18/0215;
(Continued)

(56) References Cited

U.S. PATENT DOCUMENTS 6,457,948 B1 * 10/2002 Pham ................... F04C 23/008
417/212
6,607,367 B1 8/2003 Shibamoto et al.
(Continued)

FOREIGN PATENT DOCUMENTS

JP 2004156533 A 6/2004
KR 100384511 B1 5/2003

OTHER PUBLICATIONS

Written Opinion of the ISA/KR regarding International Application No. PCT/US2017/067985 dated Apr. 12, 2018.
(Continued)

*Primary Examiner* — Dominick L Plakkoottam
(74) *Attorney, Agent, or Firm* — Harness, Dickey & Pierce, P.L.C.

(57) ABSTRACT

Systems and methods for scroll unloading detection are provided and include a scroll compressor having a scroll compression mechanism. A controller determines a predicted discharge temperature of the scroll compressor, receives an actual discharge temperature of the scroll compressor, and compares the predicted discharge temperature with the actual discharge temperature. The controller also compares a speed of the scroll compressor with a speed threshold and detects unloading of the scroll compression mechanism based on the comparison of the predicted discharge temperature with the actual discharge temperature and based on the comparison of the speed of the scroll compressor with the speed threshold. The controller performs at least one of generating an alert and a remediating action in response to detecting the unloading of the scroll compression mechanism.

18 Claims, 5 Drawing Sheets

(51) Int. Cl.
*F04C 28/08* (2006.01)
*F04C 18/02* (2006.01)
*F01C 1/02* (2006.01)
*F25B 1/04* (2006.01)
*F25B 49/00* (2006.01)

(52) U.S. Cl.
CPC ........ *F01C 1/0223* (2013.01); *F04C 18/0207* (2013.01); *F04C 18/0215* (2013.01); *F04C 18/0223* (2013.01); *F04C 18/04* (2013.01); *F04C 28/08* (2013.01); *F25B 1/04* (2013.01); *F25B 49/005* (2013.01); *F04C 2270/052* (2013.01); *F04C 2270/19* (2013.01); *F04C 2270/78* (2013.01); *F04C 2270/80* (2013.01); *F04C 2270/86* (2013.01); *F25B 2600/0253* (2013.01); *F25B 2600/0262* (2013.01); *F25B 2600/111* (2013.01); *F25B 2700/197* (2013.01); *F25B 2700/2116* (2013.01); *F25B 2700/2117* (2013.01); *F25B 2700/21151* (2013.01); *F25B 2700/21152* (2013.01)

(58) Field of Classification Search
CPC .............. F04C 18/0223; F04C 18/0292; F25B 2600/025; F25B 2600/026; F25B 2700/21152; F25B 49/022

USPC ....................... 417/53, 410.5; 418/55.1–55.5
See application file for complete search history.

(56) References Cited

U.S. PATENT DOCUMENTS

| | | |
|---|---|---|
| 6,619,062 B1 | 9/2003 | Shibamoto et al. |
| 2009/0235678 A1* | 9/2009 | Taras ...................... F24F 3/153 62/115 |
| 2011/0048042 A1* | 3/2011 | Chen ...................... F25B 9/008 62/115 |
| 2011/0132007 A1 | 6/2011 | Weyna et al. |
| 2013/0152615 A1* | 6/2013 | Lee ......... H05K 7/207 62/241 |
| 2013/0336810 A1* | 12/2013 | Worden ................. F04B 49/00 417/53 |

OTHER PUBLICATIONS

International Search Report of the ISA/KR regarding International Application No. PCT/US2017/067985 dated Apr. 12, 2018.

* cited by examiner

SCROLL UNLOADING DETECTION SYSTEM

CROSS-REFERENCE TO RELATED APPLICATIONS

This application claims the benefit of U.S. Provisional Application No. 62/438,084, filed on Dec. 22, 2016. The entire disclosure of the above application is incorporated herein by reference.

FIELD

The present disclosure relates to scroll unloading detection systems and methods and, more particularly, to systems and methods for detecting and remediating scroll unloading.

BACKGROUND

This section provides background information related to the present disclosure and is not necessarily prior art.

Scroll compressors are used in climate-control systems such as, for example, heat-pump systems, refrigeration systems, air conditioning systems, and the like. Under certain operating conditions, however, scroll compressors can be subject to unintentional unloading, including axial and radial unloading, of the scroll compression mechanism. Such unintentional unloading of the scroll compression mechanism can result in increased noise, interruptions in compression, decreased efficiency, and premature wear of the scroll compression mechanism.

SUMMARY

This section provides a general summary of the disclosure, and is not a comprehensive disclosure of its full scope or all of its features.

The present disclosure provides a system that includes a scroll compressor having a scroll compression mechanism and a controller. The controller determines a predicted discharge temperature of the scroll compressor, receives an actual discharge temperature of the scroll compressor, compares the predicted discharge temperature with the actual discharge temperature, compares a speed of the scroll compressor with a speed threshold, detects unloading of the scroll compression mechanism based on the comparison of the predicted discharge temperature with the actual discharge temperature and based on the comparison of the speed of the scroll compressor with the speed threshold, and performs at least one of generating an alert and a remediating action in response to detecting the unloading of the scroll compression mechanism.

In some configurations, the controller determines a difference between the actual discharge temperature and the predicted discharge temperature in response to the actual discharge temperature being greater than the predicted discharge temperature, compares the difference with a predetermined threshold, and determines that the unloading of the scroll compression mechanism is axial unloading of the scroll compression mechanism in response to the difference being greater than the predetermined threshold and the speed of the scroll compressor not being less than the speed threshold.

In some configurations, the controller performs the remediating action and the remediating action includes adjusting operation of a condenser fan of a climate control system associated with the scroll compressor.

In some configurations, the controller determines a difference between the actual discharge temperature and the predicted discharge temperature in response to the actual discharge temperature being greater than the predicted discharge temperature, compares the difference with a predetermined threshold, and determines that the unloading of the scroll compression mechanism is radial unloading of the scroll compression mechanism in response to the difference being greater than the predetermined threshold and the speed of the scroll compressor being less than the speed threshold.

In some configurations, the controller performs the remediating action and wherein the remediating action includes increasing the speed of the scroll compressor.

In some configurations, the controller determines a saturated condensing temperature of a condenser of a climate control system associated with the scroll compressor, determines a saturated evaporating temperature of an evaporator of the climate control system associated with the scroll compressor, and determines the predicted discharge temperature of the scroll compressor based on the saturated condensing temperature and the saturated evaporating temperature.

In some configurations, the controller uses a model of the scroll compressor to determine the predicted discharge temperature of the scroll compressor, the model of the scroll compressor including a polynomial equation used by the controller to calculate the predicted discharge temperature based on the saturated condensing temperature and the saturated evaporating temperature.

In some configurations, the controller determines a suction superheat of refrigerant entering the scroll compressor and additionally determines the predicted discharge temperature of the scroll compressor based on the suction superheat.

In some configurations, the controller generates the alert and outputs the alert to at least one of a system controller in communication with the controller, a thermostat in communication with the controller, and a graphical display.

In another form, the present disclosure provides a method comprising determining, with a controller, a predicted discharge temperature of a scroll compressor having a scroll compression mechanism. The method also includes receiving, with a controller, an actual discharge temperature of the scroll compressor. The method also includes comparing, with the controller, the predicted discharge temperature with the actual discharge temperature. The method also includes comparing, with the controller, a speed of the scroll compressor with a speed threshold. The method also includes detecting, with the controller, unloading of the scroll compression mechanism based on the comparison of the predicted discharge temperature with the actual discharge temperature and based on the comparison of the speed of the scroll compressor with the speed threshold. The method also includes performing, with the controller, at least one of generating an alert and a remediating action in response to detecting the unloading of the scroll compression mechanism.

In some configurations, the method further includes determining, with the controller, a difference between the actual discharge temperature and the predicted discharge temperature in response to the actual discharge temperature being greater than the predicted discharge temperature. The method also includes comparing, with the controller, the difference with a predetermined threshold. The method also includes determining, with the controller, that the unloading of the scroll compression mechanism is axial unloading of the scroll compression mechanism in response to the difference being greater than the predetermined threshold and the speed of the scroll compressor not being less than the speed threshold.

In some configurations, the controller performs the remediating action and wherein the remediating action includes adjusting operation of a condenser fan of a climate control system associated with the scroll compressor.

In some configurations, the method further includes determining, with the controller, a difference between the actual discharge temperature and the predicted discharge temperature in response to the actual discharge temperature being greater than the predicted discharge temperature. The method further includes comparing, with the controller, the difference with a predetermined threshold. The method further includes determining, with the controller, that the unloading of the scroll compression mechanism is radial unloading of the scroll compression mechanism in response to the difference being greater than the predetermined threshold and the speed of the scroll compressor being less than the speed threshold.

In some configurations, the controller performs the remediating action and wherein the remediating action includes increasing the speed of the scroll compressor.

In some configurations, the method further includes determining, with the controller, a saturated condensing temperature of a condenser of a climate control system associated with the scroll compressor. The method further includes determining, with the controller, a saturated evaporating temperature of an evaporator of the climate control system associated with the scroll compressor. The method further includes determining, with the controller, the predicted discharge temperature of the scroll compressor based on the saturated condensing temperature and the saturated evaporating temperature.

In some configurations, the controller uses a model of the scroll compressor to determine the predicted discharge temperature of the scroll compressor, the model of the scroll compressor including a polynomial equation used by the controller to calculate the predicted discharge temperature based on the saturated condensing temperature and the saturated evaporating temperature.

In some configurations, the method further includes determining, with the controller, a suction superheat of refrigerant entering the scroll compressor and wherein the controller additionally determines the predicted discharge temperature of the scroll compressor based on the suction superheat.

In some configurations, the controller generates the alert and outputs the alert to at least one of a system controller in communication with the controller, a thermostat in communication with the controller, and a graphical display.

In another form, the present disclosure provides a system that includes a scroll compressor having a scroll compression mechanism and a controller that determines a predicted discharge temperature of the scroll compressor. The controller receives an actual discharge temperature of the fixed-speed scroll compressor, compares the predicted discharge temperature with the actual discharge temperature, and detects unloading of the scroll compression mechanism based on the comparison of the predicted discharge temperature with the actual discharge temperature. The controller performs at least one of generating an alert and a remediating action in response to detecting the unloading of the scroll compression mechanism.

In some configurations, the controller performs the remediating action and the remediating action includes adjusting operation of a condenser fan of a climate control system associated with the scroll compressor.

In some configurations, the scroll compressor is a fixed-speed scroll compressor.

In some configurations, the scroll compressor is a variable-speed scroll compressor.

In some configurations, the unloading detected by the controller is axial unloading of the scroll compression mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
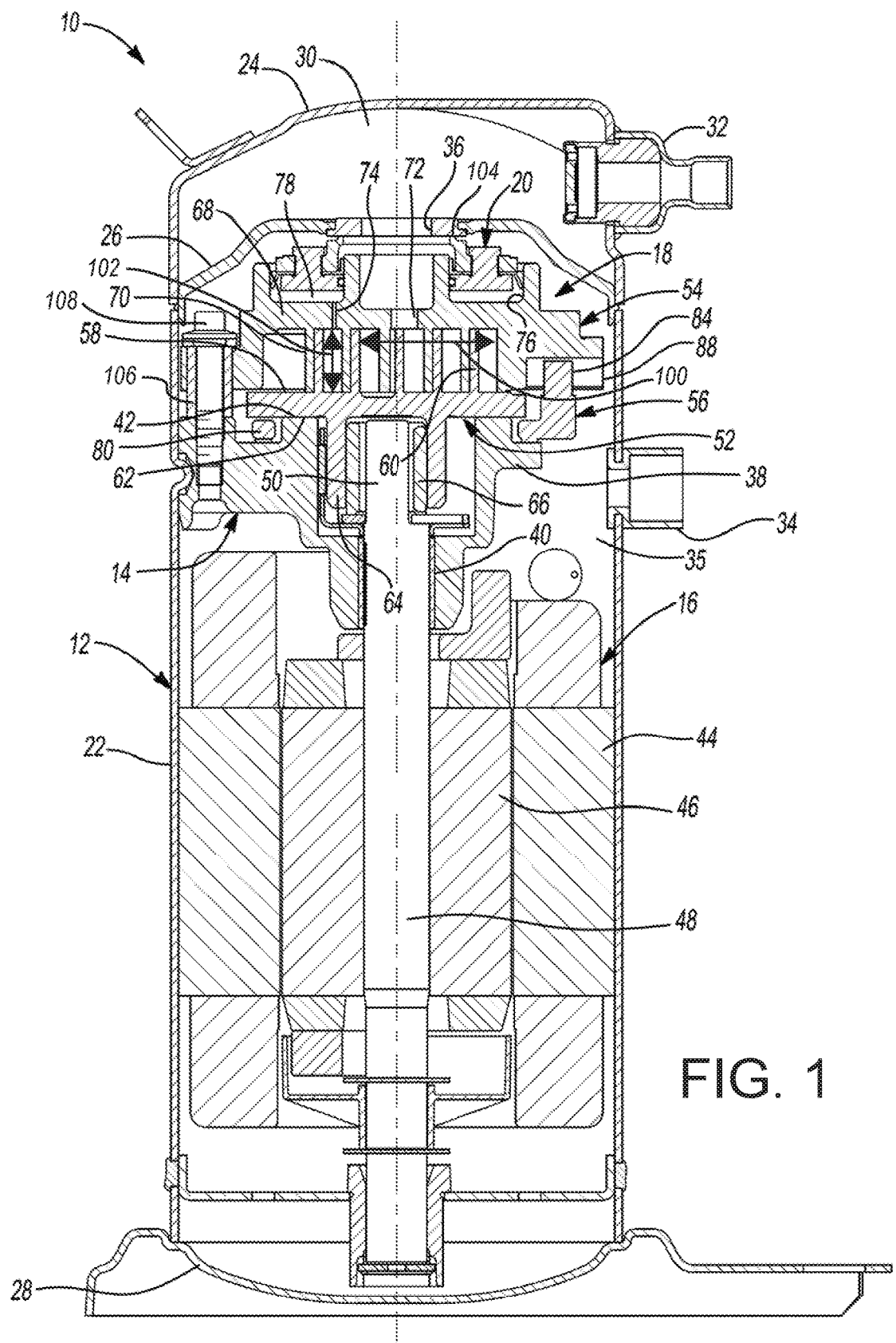
FIG. 1 is a cross-sectional view of a compressor according to the present disclosure.

With reference to FIG. 1, a compressor 10 includes a hermetic shell assembly 12, a bearing housing assembly 14, a motor assembly 16, a compression mechanism 18, and a floating seal assembly 20. The shell assembly 12 may generally form a compressor housing and may include a cylindrical shell 22, an end cap 24 at the upper end thereof, a transversely extending partition 26, and a base 28 at a lower end thereof. The end cap 24 and partition 26 may generally define a discharge chamber 30. A discharge fitting 32 may be attached to the shell assembly 12 at an opening in the end cap 24. A suction gas inlet fitting 34 may be attached to the shell assembly 12 at another opening and may communicate with a suction chamber 35 defined by the shell 22 and the partition 26. The partition 26 may include a discharge passage 36 therethrough providing communication between the compression mechanism 18 and the discharge chamber 30.

The bearing housing assembly 14 may be affixed to the shell 22 and may include a main bearing housing 38 and a bearing 40. The main bearing housing 38 may house the bearing 40 therein and may define an annular flat thrust bearing surface 42 on an axial end surface thereof.

The motor assembly 16 may include a motor stator 44, a rotor 46, and a driveshaft 48. The motor stator 44 may be press fit into the shell 22. The driveshaft 48 may be rotatably driven by the rotor 46 and may be rotatably supported within the bearing 40. The rotor 46 may be press fit on the driveshaft 48. The driveshaft 48 may include an eccentric crankpin 50.

The compression mechanism 18 may generally include an orbiting scroll 52, a non-orbiting scroll 54, and an Oldham coupling 56. The orbiting scroll 52 may include an end plate 58 having a spiral wrap 60 on the upper surface thereof and an annular flat thrust surface 62 on the lower surface. The thrust surface 62 may interface with the annular flat thrust bearing surface 42 on the main bearing housing 38. The Oldham coupling 56 may be engaged with the orbiting and non-orbiting scrolls 52, 54 or with the orbiting scroll 52 and the main bearing housing 38 to prevent relative rotation therebetween.

The non-orbiting scroll 54 may include an end plate 68 and a spiral wrap 70 projecting downwardly from the end plate 68. The spiral wrap 70 may meshingly engage the spiral wrap 60 of the orbiting scroll 52, thereby creating a series of moving fluid pockets. The fluid pockets defined by the spiral wraps 60, 70 may decrease in volume as they move from a radially outer position (at a suction pressure) to a radially intermediate position (at an intermediate pressure) to a radially inner position (at a discharge pressure) throughout a compression cycle of the compression mechanism 18.

A cylindrical hub 64 may project downwardly from the thrust surface 62 and may have an unloader bushing 66 rotatably disposed therein. The unloader bushing 66 may include an inner bore in which the crankpin 50 is drivingly disposed. A flat surface of the crankpin 50 may drivingly engage a flat surface in a portion of the inner bore of the unloader bushing 66. During operation, the driveshaft 48 is driven by the motor assembly 16, thereby rotating the crankpin 50 and causing orbiting movement of the orbiting scroll 52. Specifically, as the crankpin 50 rotates, the vanes of the spiral wrap 60 of the orbiting scroll 52 are flung out by inertial force to meet the vanes of the spiral wrap 70 of the non-orbiting scroll 54. The unloader bushing 66 is engaged with the crankpin 50 and allows some radial slippage movement between the crankpin 50 and the cylindrical hub 64. In this way, the radial slippage movement allowed by the unloader bushing 66 enables the compression mechanism 18 to process liquid refrigerant that may, under some operating conditions, be introduced into the compression mechanism 18. For example, under normal operating conditions the compression mechanism 18 may operate to compress refrigerant vapor. Under other operating conditions, however, some liquid refrigerant may be introduced into the compression mechanism 18. Because the liquid refrigerant is incompressible, the compression mechanism 18, in those instances, may need to process the incompressible liquid refrigerant through the compression mechanism 18. By allowing radial slippage movement, the vanes of the spiral wrap 60 of the orbiting scroll 52 can separate from the vanes of the spiral wrap 70 of the non-orbiting scroll 54 to allow the incompressible liquid refrigerant to move through the compression mechanism 18.

As shown in FIG. 1, the non-orbiting scroll 54 is slidably attached to a sleeve guide 106. The sleeve guide 106 receives a bolt 108 that is secured to the main bearing housing 38. While a single sleeve guide 106 and bolt 108 are shown in the cross-sectional view of FIG. 1, additional sleeve guides 106 and bolts 108 can be used. For example, four sleeve guides 106 and bolts 108 may be used. The sleeve guide 106 allows the non-orbiting scroll 54 to slide up and down the sleeve guide 106 between the thrust bearing surface 42 of the main bearing housing 38 on the lower side and the underside of the bolt 108 on the upper side.

The end plate 68 may include a discharge passage 72, an intermediate passage 74, and an annular recess 76. The discharge passage 72 is in communication with one of the fluid pockets at the radially inner position and allows compressed working fluid, e.g., at the discharge pressure, to flow into the discharge chamber 30. The intermediate passage 74 may provide communication between one of the fluid pockets at the radially intermediate position and the annular recess 76. The annular recess 76 may receive the floating seal assembly 20 and cooperate with the floating seal assembly 20 to define an axial biasing chamber 78 therebetween. The axial biasing chamber 78 receives compressed vapor from the fluid pocket in the intermediate position through the intermediate passage 74. A pressure differential between the intermediate-pressure vapor in the biasing chamber 78 and vapor in the suction chamber 35 exerts an axial biasing force on the non-orbiting scroll 54 urging the non-orbiting scroll 54 toward the orbiting scroll 52 to sealingly engage the scrolls 52, 54 with each other. In other words, the tips of the vanes of the spiral wrap 70 of the non-orbiting scroll 54 are urged against the orbiting scroll 52 to form a seal therebetween. Likewise, the tips of the vanes of the spiral wrap 60 of the orbiting scroll 52 are urged against the non-orbiting scroll 54 to form a seal therebetween.

In addition, the pressure differential between the intermediate-pressure vapor in the biasing chamber 78 and vapor in the suction chamber 35 also exerts an axial biasing force on the floating seal assembly 20 toward the partition 26 to form a face seal 104. The face seal 104 seals the discharge passage 72, the discharge passage 36, and the discharge chamber 30 from the suction chamber 35.

As described above, the pressure differential between the intermediate-pressure vapor in the biasing chamber 78 and vapor in the suction chamber 35 exerts an axial biasing force on the non-orbiting scroll 54 toward the orbiting scroll 52 to form a seal therebetween and on the floating seal assembly 20 toward the partition to form the face seal 104. As such, the compression mechanism 18, including the orbiting scroll and the non-orbiting scroll 54, is referred to as a dual pressure balance scroll compression mechanism.

In the present disclosure, the term axial sealing and axial seals refers to the sealing and seals resulting from the axial biasing force exerted by the pressure differential between the intermediate-pressure vapor in the biasing chamber 78 and vapor in the suction chamber 35. In other words, the axial sealing and seals include the face seal 104, the seal formed by the tips of the vanes of the spiral wrap 70 of the non-orbiting scroll 54 against the orbiting scroll 52, and the seal formed by the tips of the vanes of the spiral wrap 60 of the orbiting scroll 52 against the non-orbiting scroll 54. The axial sealing and axial seals are formed by the axial biasing force in the axial direction, indicated by double-headed arrow 102.

Similarly, in the present disclosure, the term radial sealing and radial seals refers to the sealing and seals resulting from the radial biasing force exerted by the inertial force of the vanes of the spiral wrap 60 of the orbiting scroll 52 against the vanes of the spiral wrap 70 of the non-orbiting scroll 54. As discussed above, during operation, the motor assembly 16 rotates the driveshaft 48 and the crankpin 50, causing orbiting movement of the orbiting scroll 52. As the crankpin 50 rotates, the vanes of the spiral wrap 60 of the orbiting scroll 52 are flung out by inertial force to meet the vanes of the spiral wrap 70 of the non-orbiting scroll 54, thereby forming a seal between the vanes of the spiral wrap 60 of the orbiting scroll 52 and the vanes of the spiral wrap 70 of the non-orbiting scroll 54. In the case of a variable-speed compressor, increased compressor speed may result in a greater inertial force being exerted on the vanes of the spiral wrap 60 of the orbiting scroll 52 against the vanes of the spiral wrap 70 of the non-orbiting scroll 54. Similarly, decreased compressor speed may result in a decreased inertial force being exerted on the vanes of the spiral wrap 60 of the orbiting scroll 52 against the vanes of the spiral wrap 70 of the non-orbiting scroll 54. The radial sealing and radial seals are formed by the radial biasing force in the radial direction, indicated by double headed arrow 100.

When one or more of the above described seals are broken, unintentional unloading or leakage of the compression mechanism 18 and loss of compression may occur. For example, axial unloading or leakage may occur when the pressure differential between the intermediate-pressure vapor in the biasing chamber 78 and vapor in the suction chamber 35 is insufficient to maintain either the face seal 104 or the seals formed by the tips of the vanes of the spiral wraps 60, 70 against the non-orbiting scroll 54 and the orbiting scroll 52, respectively. For this reason, there are two types of axial unloading or leakage. First, axial unloading or leakage may occur when the face seal 104 is broken and the floating seal assembly 20 drops down, either fully or partially, away from the partition 26. This type of axial unloading or leakage results in a high discharge pressure to suction pressure leak and, consequently, in recompression losses, decreased compressor capacity, increased motor temperatures, increased discharge temperature (e.g., the temperature of refrigerant exiting the compressor 10 and/or the compression mechanism 18), and increased electrical current consumption of the electrical motor. Second, axial unloading or leakage may occur when the non-orbiting scroll 54 raises up, breaking the seals formed by the tips of the vanes of the spiral wraps 60, 70 against the non-orbiting scroll 54 and the orbiting scroll 52, respectively. In this type of axial unloading or leakage, the scroll compression pockets communicate with each other, allowing leakage across the tips of the vanes of the spiral wraps 60, 70. Although some compression may still be occurring, this type of axial unloading also results in recompression losses, decreased compressor capacity, increased discharge temperature (although perhaps not as significant of increases as compared with the first type of axial unloading), and increased electrical current consumption of the electrical motor.

Figure 2:
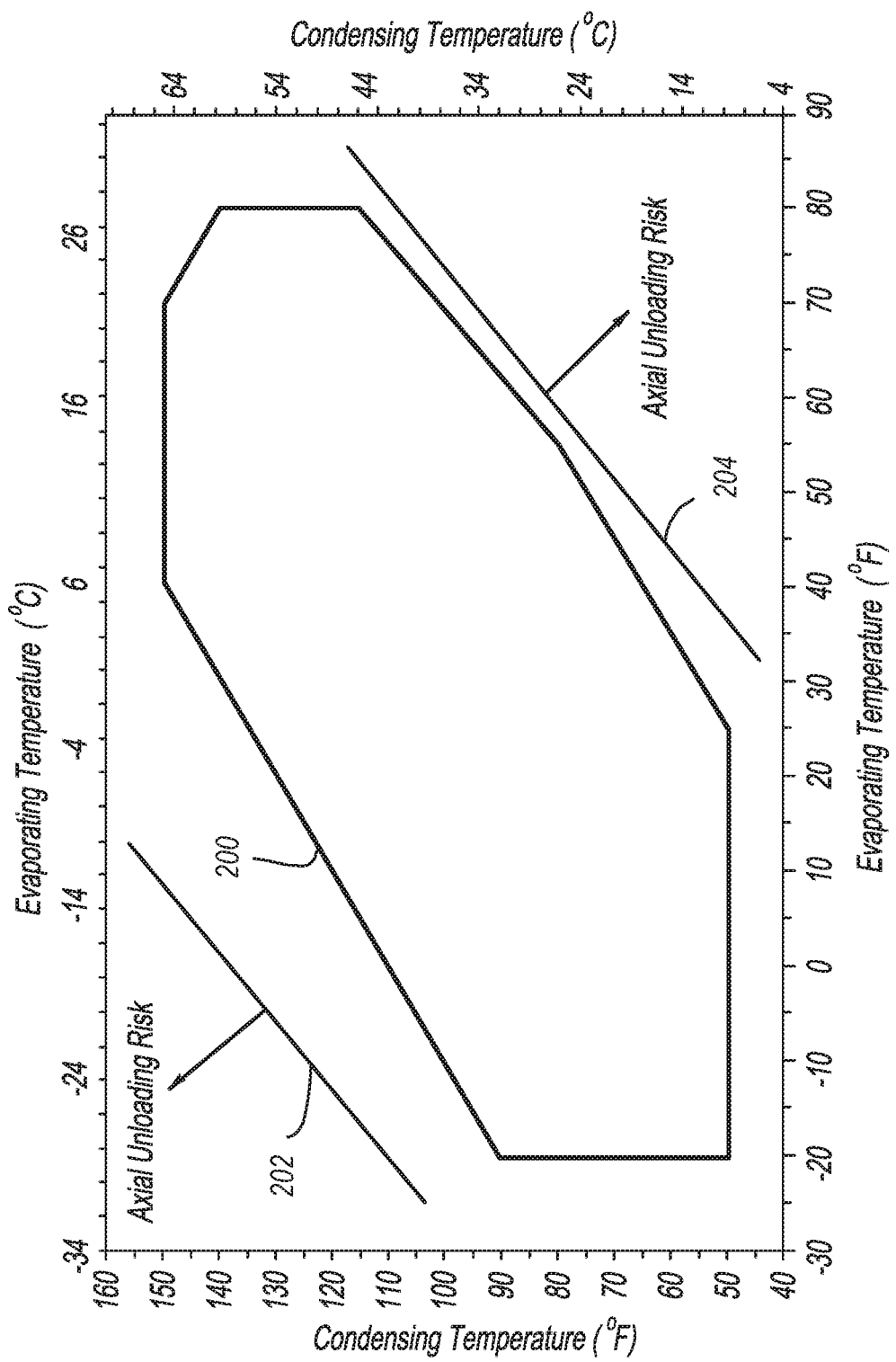
FIG. 2 is a graph of an operating envelope of a compressor according to the present disclosure.

With reference to FIG. 2, axial unloading may occur under certain operating conditions of a particular compressor 10. In other words, the design parameters for a particular compressor 10, coupled with the particular operating conditions, such as operation of the compressor 10 in a climate-control system with particular evaporating and condensing temperatures, dictate whether the compressor may be at risk for axial unloading. For example, as shown in FIG. 2, an example operating envelope 200 for a compressor 10 is shown with condensing temperatures plotted on the vertical axis and evaporating temperatures plotted on the horizontal axis. In the example of FIG. 2, operation of the compressor 10 in a climate-control system with condensing and evaporating temperatures within the operating envelope 200 can result in a sufficient pressure differential between the intermediate-pressure vapor in the biasing chamber 78 and vapor in the suction chamber 35 to maintain the face seal 104 and the seals between the tips of the vanes of the spiral wraps 60, 70 and the non-orbiting scroll 54 and the orbiting scroll 52, respectively. In other words, while operating under condensing and evaporating temperatures within the operating envelope 200, the compressor 10 is able to maintain axial sealing and operate normally. As further shown in FIG. 2, operation of the compressor under evaporating and condensing temperature conditions outside of the operating envelope 200 may result in an axial unloading risk, as shown in particular by the areas demarcated by lines 202 and 204.

Radial unloading may occur when the inertial force being exerted on the vanes of the spiral wrap 60 of the orbiting scroll 52 is insufficient to cause the vanes of the spiral wrap 60 of the orbiting scroll 52 to seal against the vanes of the spiral wrap 70 of the non-orbiting scroll 54. In other words, the design parameters for a particular compressor 10 coupled with the particular operating conditions, such as operation of the compressor 10 in a climate-control system with particular evaporating and condensing temperatures, and coupled with the particular speed of the compressor 10 while operating at the particular operating conditions dictate whether the compressor may be at risk for radial unloading. For example, radial unloading may occur under operating conditions where the speed of the compressor 10 is too slow to generate enough inertial force on the vanes of the spiral wrap 60 of the orbiting scroll 52 to seal against the vanes of the spiral wrap 70 of the non-orbiting scroll 54. In such case, with insufficient inertial force exerted on the vanes of the spiral wrap 60 of the orbiting scroll 52, the vanes of the spiral wrap 60 of the orbiting scroll 52 may not seal against the vanes of the spiral wrap 70 of the non-orbiting scroll 54 and the fluid pockets formed by the meshing engagement of the spiral wraps 60, 70 may communicate with each other, resulting in loss of compression and leakage across the flanks of the spiral wraps 60, 70. Radial unloading may result in recompression losses, decreased compressor capacity, increased discharge temperature, and increased electrical current consumption of the electrical motor.

While a dual pressure balance scroll compression mechanism is shown in FIG. 1 and described above, the present teachings can apply to other types of scroll compression mechanisms. For example, the present teachings can apply to scroll compression mechanisms with a non-orbiting scroll that does not slide on a sleeve guide 106 (sometimes referred to as a fixed-fixed scroll compression mechanism). The present teachings can also apply to scroll compression mechanisms that utilize a pressure balance underneath the orbiting scroll to force the orbiting scroll against the non-orbiting scroll. The present teachings can also apply to scroll compression mechanisms that utilize tip seals, i.e., seals inside the vanes of the spiral wraps that pop up during operation to form axial seals. The present teachings can also apply to compression mechanisms that utilize a floating frame arrangement, whereby a pressure balance is used to exert force on the main bearing housing against the scrolls of the scroll compression mechanism. The present teachings can also apply to flat top scroll compression mechanisms that do not include a floating seal assembly, but that utilize a pressure differential to exert force on the non-orbiting scroll against the partition. The present teachings may also apply to other scroll compression mechanisms that are susceptible to unloading, including axial or radial unloading, as described above.

As described above, unintentional unloading of the scroll compression mechanism, including axial and radial unloading, can result in increased noise during operation of the scroll compressor, interruptions in compression during operation of the scroll compressor, decreased efficiency, and premature wear of the scroll compression mechanism. As such, the present disclosure provides systems and methods to detect and remediate scroll unloading.

Figure 3:
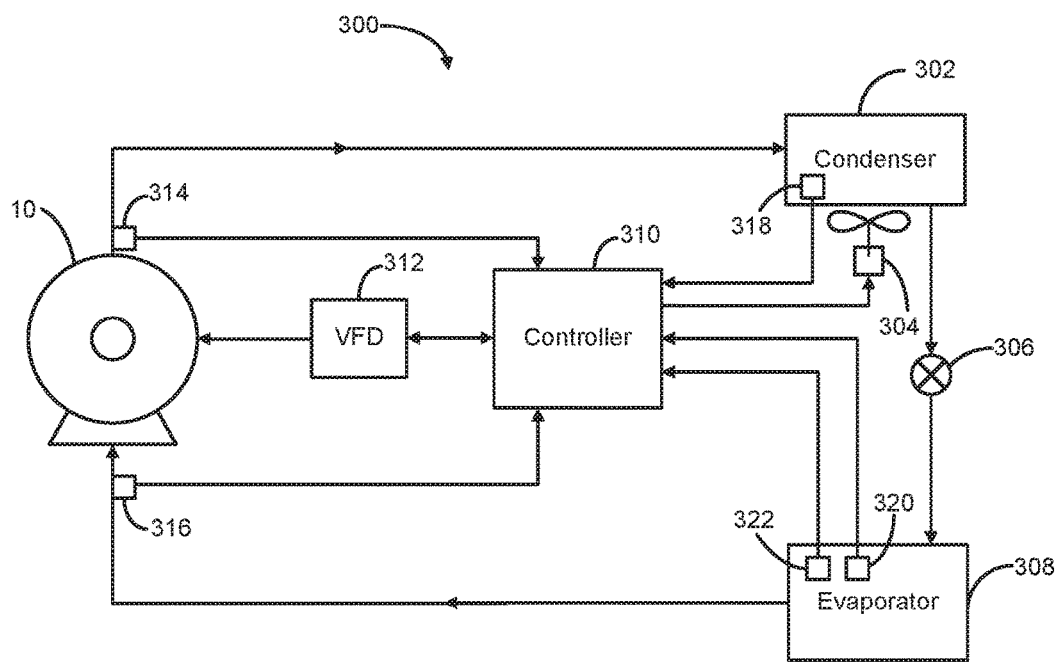
FIG. 3 is a block diagram of a climate-control system according to the present disclosure.

With reference to FIG. 3, a block diagram of a climate-control system 300 according to the present disclosure is shown. The climate-control system 300 includes a compressor 10, a condenser 302 with a condenser fan 304, an expansion device 306, and an evaporator 308. The climate-control system 300, for example, may be an air conditioner, whereby the evaporator 308 is located indoors and the condenser 302 and condenser fan 304 are located outdoors. The climate-control system 300 also includes a controller 310 and a variable frequency drive (VFD) 312 that controls a frequency of power delivered to the compressor 10 to drive the motor of the compressor 10 at various speeds. As such, the compressor 10 with the VFD 312 may be referred to as a variable speed compressor. As discussed in further detail below, however, the present disclosure also applies to fixed speed compressors, i.e., compressors that operate at a single speed.

The compressor 10 receives refrigerant vapor from the evaporator 308, compresses the refrigerant vapor, and delivers high pressure refrigerant vapor to the condenser 302. The high pressure refrigerant vapor is cooled by a condenser coil of the condenser 302 and the condenser fan 304. As the high pressure refrigerant vapor is circulated through the condenser coil, heat is rejected from the refrigerant vapor and carried away from the condenser coil by the air flow generated by the condenser fan 304. The reduction in temperature causes the refrigerant vapor to condense to a liquid refrigerant state. While a condenser 302 with a single condenser fan 304 is shown, multiple condenser fans may be used. Also, the condenser fan 304 may be a fixed speed or variable speed condenser fan.

The condenser 302 delivers liquid refrigerant to the expansion device 306, which reduces the pressure of the liquid refrigerant, causing the liquid refrigerant to start to transition from the liquid state to a vapor state. The low-pressure mixture of liquid and vapor refrigerant is then delivered to the evaporator 308. A fan circulates an air flow over an evaporator coil of the evaporator 308 such that heat from the air flow is absorbed by the low-pressure mixture of liquid and vapor refrigerant. The heat absorption, combined with the decrease in pressure caused by the expansion device 306, causes the refrigerant to change state back to the vapor state. The refrigerant vapor is then delivered back to the compressor 10 and the refrigeration cycle starts anew.

The controller 310 may receive, for example, a demand for cooling from a thermostat or another controller, such as a system controller. Based on the received demand for cooling, the controller 310 may activate the compressor 10 and may communicate with the VFD 312 to operate the compressor 10 at a determined capacity percentage. For example, the controller 310 may instruct the VFD 312 to operate the compressor 10 at fifty percent capacity. In such case, the VFD 312 may control the compressor 10 to operate at a speed that is half of the full speed of the compressor 10.

The controller 310 may also receive operating condition data from one or more operating condition sensors. For example, the controller 310 may receive a discharge temperature (Td) from a discharge line temperature sensor 314 or from a discharge temperature sensor internal to the compressor 10. The controller may also receive a suction temperature (Ts) from a suction line temperature sensor 316 or from a suction temperature sensor internal to the compressor. The controller 310 may also receive a saturated condensing temperature (Tcond) from a condenser temperature sensor 318. The controller 310 may also receive a saturated evaporating temperature (Tevap) from an evaporator temperature sensor 320. The controller 310 may also receive a saturated evaporating pressure (Pevap) from an evaporator pressure sensor 322. Alternatively, a combination temperature and pressure sensor may be used in place of the evaporator temperature sensor 320 and the evaporator pressure sensor 322.

Although a number of sensors 314, 316, 318, 320, 322 are shown in FIG. 3, the controller 310 may additionally or alternatively receive operating condition data from other sources, including other controllers and/or devices associated with the climate control system 300. For example, the controller 310 may receive operating condition data from communication with a system controller, a thermostat, a condenser fan controller, an evaporator fan controller, an indoor monitoring or diagnostic module, an outdoor monitoring or diagnostic module, or another suitable controller, device, and/or module associated with the climate control system 300. Additionally, one or more of the operating condition temperatures or pressures (Td, Ts, Tcond, Tevap, and Pevap) may be calculated or derived based on other sensed data. For example only, Tevap may be derived as a function of Tcond, Td, and compressor speed, as described in commonly assigned U.S. Pat. No. 9,057,549, which is incorporated herein by reference in its entirety. For further example only, Tcond may be derived as a function of compressor power, compressor speed, and Tevap, as described in commonly assigned U.S. Pat. No. 9,057,549, which is incorporated herein by reference in its entirety. Tevap and Tcond may also be derived from operating condition temperatures and/or pressures, as described in commonly assigned U.S. Pat. No. 8,418,483, which is incorporated herein by reference in its entirety. Compressor speed may be sensed by a speed sensor. Additionally or alternatively, compressor speed may be determined or known by the VFD 312 and communicated to the controller 310. Additionally or alternatively, compressor current, compressor voltage, and/or compressor power may be determined or known by the VFD 312 and communicated to the controller 310. The operating condition temperatures and pressures (Td, Ts, Tcond, Tevap, and/or Pevap) may additionally or alternatively be calculated or derived based on other calculated, derived, or sensed data associated with the climate control system 300.

Figure 4:
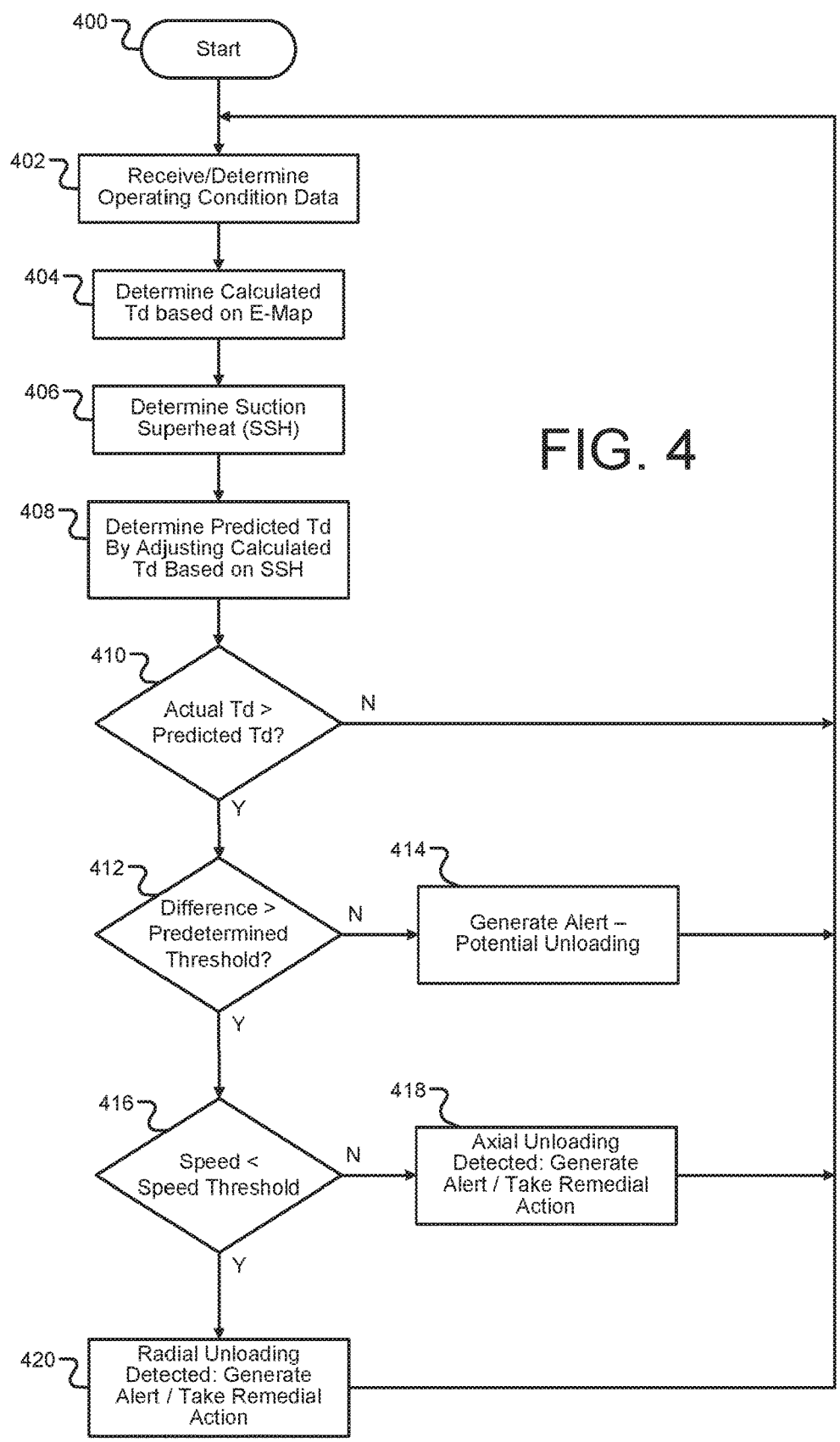
FIG. 4 is a flow chart for a scroll unloading detection method according to the present disclosure.

With reference to FIG. 4, a flow chart for a scroll unloading detection method according to the present disclosure is shown. The method may be performed by the controller 310. Additionally or alternatively, the method may be performed by another controller, device, or module. For example, the method may be performed by a system controller, a controller associated with the VFD 312, or another suitable controller, device, or module. The method starts at 400.

At 402, the controller 310 receives and/or determines the operating condition data. For example, at 402 the controller 310 may receive the operating condition temperatures and pressures, including Td, Ts, Tcond, Tevap, and/or Pevap, from the various sensors 314, 316, 318, 320, 322. Additionally or alternatively, the controller 310 may calculate or derive one or more of the operating condition temperatures and pressures (Td, Ts, Tcond, Tevap, and/or Pevap) as discussed in detail above.

At 404, the controller 310 determines a calculated Td based on the received and/or determined operating condition data. For example, the controller 310 can determine the calculated Td based on Tcond, Tevap, and electronic map (or E-Map) data associated with the operating envelope for a particular compressor 10. The electronic map data can include, for example, a ten-coefficient performance model that is specific to the particular compressor model and size. The ten-coefficient performance model is generally published by the manufacturer of a particular compressor. The ten-coefficient performance model includes a polynomial equation used to calculate Td based on Tcond and Tevap.

Alternatively, for a variable-speed compressor, the electronic map data can include a twenty-coefficient performance model that is specific to the particular compressor model and size. The twenty-coefficient performance model can include a polynomial equation used to calculate Td based on Tcond, Tevap, and compressor speed. Whether a ten-coefficient performance model or a twenty-coefficient performance model is used, the performance models, however, may include an operating assumption that the climate-control system 300 is operating at a particular suction superheat (SSH). For example, the performance models may assume that the climate-control system 300 is operating at twenty degrees Fahrenheit. While performance models based on an assumed SSH of twenty degrees, performance models based on other assumed amounts of SSH may also be used. For example, performance models based on an SSH of 19.5 degrees Fahrenheit or 21.7 degrees Fahrenheit may also be used. Further, performance models based on other amounts of SSH, sufficiently high enough to ensure that liquid refrigerant should not be present in the return/suction line to the compressor 10 may also be used.

At 406, the controller 310 determines the current suction superheat SSH of the climate control system 300. For example, the controller 310 can determine the SSH based on sensed operating condition data. Specifically, the controller 310 can receive Pevap from the evaporator pressure sensor 322 and Ts from the suction line temperature sensor 316 and can calculate the current SSH based on Pevap and Ts. Additionally or alternatively, the controller 310 can receive suction superheat data, or data to calculate the SSH, from another controller, module, or device, such as a system controller, a thermostat, a condenser fan controller, an evaporator fan controller, an indoor monitoring or diagnostic module, an outdoor monitoring or diagnostic module, or another suitable controller or device associated with the climate control system 300.

Figure 5:
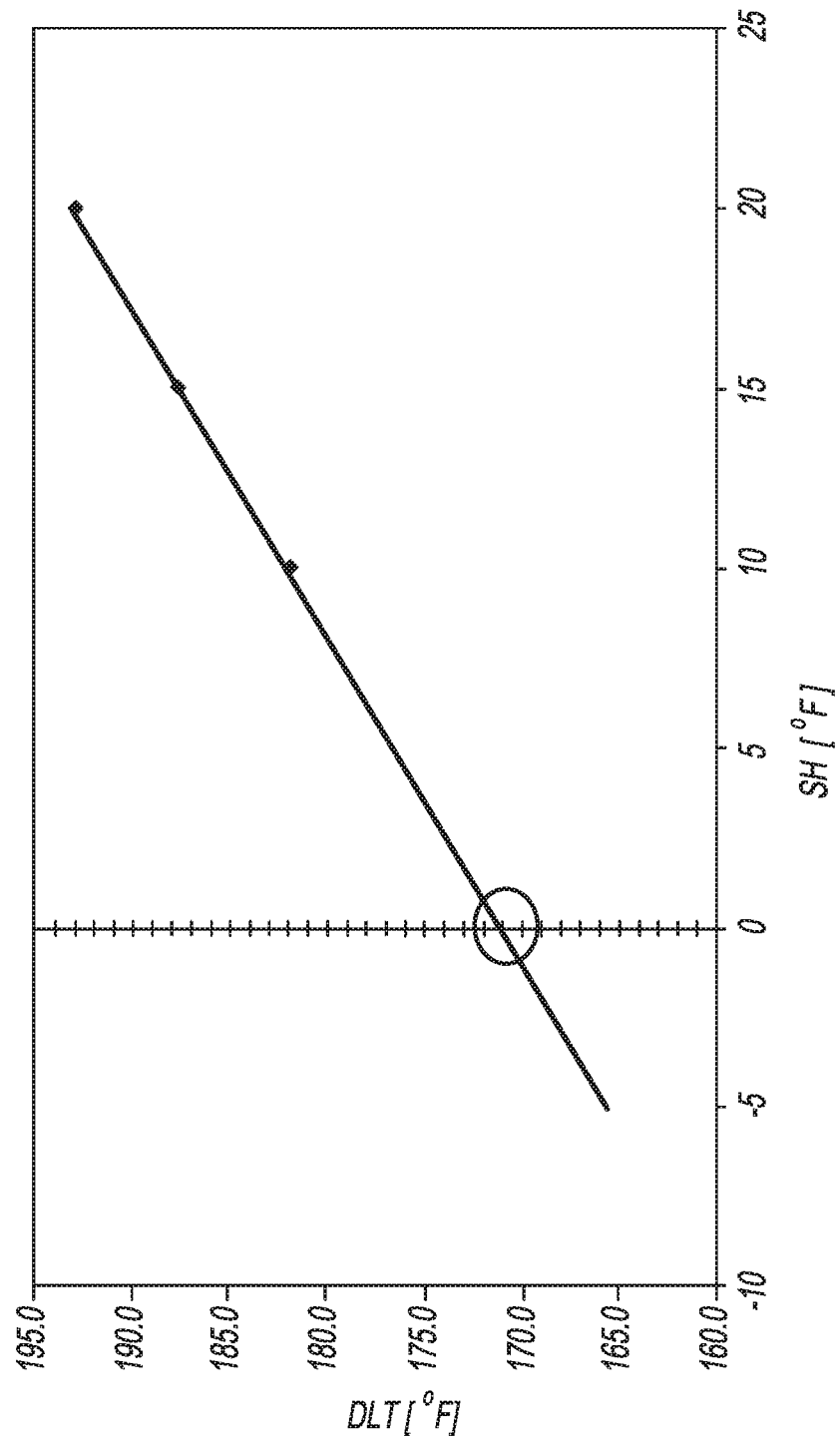
FIG. 5 is a graph showing a relationship between discharge line temperature and superheat.

At 408, the controller 310 determines a predicted Td by adjusting the calculated Td determined at 404 with the SSH determined at 406. As discussed above, the performance model used to determine the calculated discharge temperature assumes an SSH of twenty degrees Fahrenheit. The actual SSH of the climate control system 300, however, may be different than twenty degrees Fahrenheit. For example, the climate control system 300 may be operating at fifteen degrees Fahrenheit or ten degrees Fahrenheit. At 408, the controller 310 adjusts the previously calculated Td determined at 404 based on the actual SSH of the climate control system 300. Specifically, with reference to FIG. 5, Td (also referred to as DLT for discharge line temperature) has a linear relationship with SSH (also referred to as SH in FIG. 5). Based on the linear relationship and the determined actual SSH of the climate control system 300, the controller 310 at 408 adjusts the calculated Td to determine a predicted Td for the climate control system 300. For example, as shown in FIG. 5, the calculated Td determined at 404, based on the assumed SSH of twenty degrees Fahrenheit may be 193 degrees Fahrenheit for a particular set of operating conditions, i.e., Tevap and Tcond. The controller 310 may determine at 406, however, that the actual SSH of the climate control system 300 is ten degrees Fahrenheit. As shown in FIG. 5, a SSH of ten degrees Fahrenheit is associated with a Td of 180 degrees Fahrenheit for the particular set of operating conditions. As such, at 408 the controller 310 determines the predicted Td to be 180 degrees Fahrenheit. For example, the controller 310 may be programmed with information corresponding to the slope of the linear relationship shown in FIG. 5 and may adjust the calculated Td from 404 based on the SSH determined at 406 and based on the slope of the linear relationship between Td and SSH for a particular compressor, shown in FIG. 5, to arrive at a predicted Td.

At 410, the controller 310 compares the predicted Td from 408 with the actual Td, as sensed by the discharge line temperature sensor 314. At 410, in response to the actual Td being greater than the predicted Td (i.e., the actual Td is running hotter than expected, as indicated by the predicted Td), the controller 310 proceeds to 412. On the other hand, at 410, in response to the actual Td not being greater than the predicted Td, the controller 310 loops back to 402.

At 412, the controller 310 determines the difference between the actual Td and the predicted Td (i.e., actual Td−predicted Td) and compares the difference with a predetermined threshold. The predetermined threshold can be tailored or customized based on the specific application for the climate control system 300. For example, in applications that are not sensitive to noise and/or that can tolerate a greater amount of unloading, the predetermined threshold can be set to a higher number relative to other applications. In other applications that are sensitive to noise (i.e., where noisy operation is less desirable), the predetermined threshold can be set to a lower number relative to other applications.

At 412, in response to the difference not being greater than the predetermined threshold, the controller 310 proceeds to 414. At 414, for example, unloading may not be occurring, but there may be an increased potential or risk that unloading will occur. As such, at 414, the controller 310 may generate an alert that there is a potential for or risk of unloading of the compression mechanism 18. For example, the controller 310 may generate an alert that is communicated to a system controller or a thermostat, for example, associated with the climate control system 300. Additionally or alternatively, the controller 310 may control a display system, such as a graphical display associated with the compressor 10 to indicate a potential for or risk of unloading. The graphical display, for example, may include one or more LEDs and/or a graphical display screen. The controller 310 can also send the alert to a server device associated with the climate control system 300 that, in turn, communicates the alert to a user or maintenance person associated with the climate control system 300.

At 412, in response to the difference being greater than the predetermined threshold, the controller 310 proceeds to 416. At 416, the controller 310 has now determined that unloading (i.e., either axial or radial unloading) of the compression mechanism is occurring. At 416, the controller 310 compares the compressor speed with a predetermined speed threshold. For example, the speed threshold may be 2,500 revolutions per minute. Other speed thresholds, however, may be used. At 416, in response to the speed not being less than the predetermined speed threshold, the controller 310 determines that axial unloading is occurring and proceeds to 418. At 416, in response to the speed being less than the predetermined speed threshold, the controller 310 determines that radial unloading is occurring and proceeds to 420.

Alternatively, if the compressor is a fixed speed compressor, from 412, the controller 310 may simply assume that any unloading that is occurring is axial unloading. In such case, at 412 in response to the difference being greater than the predetermined threshold, the controller 310 may determine/assume that axial unloading is occurring and proceed to 418.

At 418, with the compressor speed not greater than the predetermined speed threshold, the controller 310 determines that axial unloading of the compression mechanism 18 is occurring. At 418, the controller 310 can generate an alert indicating that axial unloading of the compression mechanism 18 is occurring. For example, the controller 310 may generate an alert that is communicated to a system controller or a thermostat, for example, associated with the climate control system 300. Additionally or alternatively, the controller 310 may control a display system, such as a graphical display associated with the compressor 10 to indicate that axial unloading is occurring. The graphical display, for example, may include one or more LEDs and/or a graphical display screen. The controller 310 can also send the alert to a server device associated with the climate control system 300 that, in turn, communicates the alert to a user or maintenance person associated with the climate control system 300.

In addition, at 418 the controller 310 can also take remedial action to reduce and/or terminate the axial unloading of the compression mechanism. For example, the controller 310 may adjust operation of the condenser fan 304 to change the operating conditions of the climate control system 300 and reduce and/or terminate the axial unloading of the compression mechanism. For example, the controller 310 may increase or decrease condenser fan capacity by increasing or decreasing condenser fan speeds and/or by activated or deactivated condenser fans, if multiple condenser fans are used. In this way, with reference to FIG. 2, the controller 310 can control operating conditions (i.e., Tevap and Tcond) of the climate control system 300 so that the operating conditions fall within the operating envelope 200 of the compressor 10. As such, the controller 310 can control the condenser fan capacity in an effort to increase or decrease the Tevap and Tcond of the climate control system 300 and move the current operation of the compressor 10 back to within the operating envelope 200. In this way, the axial unloading of the compressor mechanism is reduced and/or terminated. The controller 310 then loops back to 402.

At 420, with the compressor speed less than the predetermined speed threshold, the controller 310 determines that radial unloading of the compression mechanism 18 is occurring. At 420, the controller 310 can generate an alert indicating that radial unloading of the compression mechanism 18 is occurring. For example, the controller 310 may generate an alert that is communicated to a system controller or a thermostat, for example, associated with the climate control system 300. Additionally or alternatively, the controller 310 may control a display system, such as a graphical display associated with the compressor 10 to indicate that radial unloading is occurring. The graphical display, for example, may include one or more LEDs and/or a graphical display screen. The controller 310 can also send the alert to a server device associated with the climate control system 300 that, in turn, communicates the alert to a user or maintenance person associated with the climate control system 300.

In addition, at 420 the controller 310 can also take remedial action to reduce and/or terminate the radial unloading of the compression mechanism. For example, the controller 310 may communicate with the VFD 312 to increase compressor speed. In this way, as discussed above, increased compressor speed may result in greater inertial force imparted to the orbiting scroll 52 so that the vanes of the spiral wrap 60 of the orbiting scroll 52 meet and seal with the vanes of the spiral wrap 70 of the non-orbiting scroll 54. In this way, the radial unloading of the compressor mechanism is reduced and/or terminated. The controller 310 then loops back to 402.

The method of FIG. 4 can be performed once per a predetermined sampling time period. For example, the predetermined sampling time period can be thirty seconds, forty-five seconds, or sixty seconds. As such, the climate control system 300 may have time to adjust and react to any remedial actions before the next sampling time period. If the method were performed in rapid iterations, i.e., with a quick sampling time period, the climate control system 300 may constantly be hunting for, but may never reach, a steady state.

Additionally or alternatively, the controller 310 can monitor the operating conditions, such as Tevap and Tcond, and compare the operating conditions with an operating envelope 200 of the compressor 10, as shown in FIG. 2. For example, at 412 in the method of FIG. 4, in response to the difference being greater than the threshold, the controller 310 can then check the operating conditions and compare the current Tevap and Tcond with the operating envelope 200 shown in FIG. 2. If, for example, unloading is occurring while the compressor 10 is operating inside the operating envelope, the controller 310 may determine that the unloading is radial unloading and can then generate an alert and take remedial action as described with reference to 420 of FIG. 4. Additionally, the scroll unloading detection systems and methods of the present disclosure can be incorporated into a larger envelope management and operation monitoring strategy for the compressor 10.

While FIG. 4 is directed to detecting unloading based on Td, as noted above compressor current is also an indicator of unloading. As such, alternatively or additionally, the controller 310 may monitor compressor current and determine whether unloading is occurring based on the compressor current. For example, the controller 310 may compare the compressor current with a compressor current threshold to determine whether unloading is occurring. Further, the controller 310 may monitor both the Td and compressor current to determine whether unloading is occurring based on the comparison of actual Td with a predicted Td (as described with reference to FIG. 4 above) and based on a comparison of compressor current with a compressor current threshold.

Additionally, the present teachings can be applied to a scroll compressor utilizing scroll tip seals to detect tip seal damage, wear, and/or lack of sealing. For example, the present teachings can detect when unloading is occurring and, based on an identified unloading trend, can determine that the tip seals have been damaged, have been worn, and/or are no longer providing proper sealing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
a scroll compressor having a scroll compression mechanism; and
a controller that determines a predicted discharge temperature of the scroll compressor, that receives an actual discharge temperature of the scroll compressor, that compares the predicted discharge temperature with the actual discharge temperature, that compares a speed of the scroll compressor with a speed threshold, that detects unloading of the scroll compression mechanism based on the comparison of the predicted discharge temperature with the actual discharge temperature and based on the comparison of the speed of the scroll compressor with the speed threshold, and that performs at least one of generating an alert and a remediating action in response to detecting the unloading of the scroll compression mechanism.

2. The system of claim 1, wherein the controller: determines a difference between the actual discharge temperature and the predicted discharge temperature in response to the actual discharge temperature being greater than the predicted discharge temperature; compares the difference with a predetermined threshold; and determines that the unloading of the scroll compression mechanism is axial unloading of the scroll compression mechanism in response to the difference being greater than the predetermined threshold and the speed of the scroll compressor not being less than the speed threshold.

3. The system of claim 2, wherein the controller performs the remediating action and wherein the remediating action includes adjusting operation of a condenser fan of a climate control system associated with the scroll compressor.

4. The system of claim 1, wherein the controller: determines a difference between the actual discharge temperature and the predicted discharge temperature in response to the actual discharge temperature being greater than the predicted discharge temperature; compares the difference with a predetermined threshold; and determines that the unloading of the scroll compression mechanism is radial unloading of the scroll compression mechanism in response to the difference being greater than the predetermined threshold and the speed of the scroll compressor being less than the speed threshold.

5. The system of claim 4, wherein the controller performs the remediating action and wherein the remediating action includes increasing the speed of the scroll compressor.

6. The system of claim 1, wherein the controller determines a saturated condensing temperature of a condenser of a climate control system associated with the scroll compressor, determines a saturated evaporating temperature of an evaporator of the climate control system associated with the scroll compressor, and determines the predicted discharge temperature of the scroll compressor based on the saturated condensing temperature and the saturated evaporating temperature.

7. The system of claim 6, wherein the controller uses a model of the scroll compressor to determine the predicted discharge temperature of the scroll compressor, the model of the scroll compressor including a polynomial equation used by the controller to calculate the predicted discharge temperature based on the saturated condensing temperature and the saturated evaporating temperature.

8. The system of claim 7, wherein the controller determines a suction superheat of refrigerant entering the scroll compressor and additionally determines the predicted discharge temperature of the scroll compressor based on the suction superheat.

9. The system of claim 1, wherein the controller generates the alert and outputs the alert to at least one of a system controller in communication with the controller, a thermostat in communication with the controller, and a graphical display.

10. A method comprising:
determining, with a controller, a predicted discharge temperature of a scroll compressor having a scroll compression mechanism;
receiving, with a controller, an actual discharge temperature of the scroll compressor;
comparing, with the controller, the predicted discharge temperature with the actual discharge temperature;
comparing, with the controller, a speed of the scroll compressor with a speed threshold;
detecting, with the controller, unloading of the scroll compression mechanism based on the comparison of the predicted discharge temperature with the actual discharge temperature and based on the comparison of the speed of the scroll compressor with the speed threshold; and
performing, with the controller, at least one of generating an alert and a remediating action in response to detecting the unloading of the scroll compression mechanism.

11. The method of claim 10, further comprising:
determining, with the controller, a difference between the actual discharge temperature and the predicted discharge temperature in response to the actual discharge temperature being greater than the predicted discharge temperature;
comparing, with the controller, the difference with a predetermined threshold; and
determining, with the controller, that the unloading of the scroll compression mechanism is axial unloading of the scroll compression mechanism in response to the difference being greater than the predetermined threshold and the speed of the scroll compressor not being less than the speed threshold.

12. The method of claim 11, wherein the controller performs the remediating action and wherein the remediating action includes adjusting operation of a condenser fan of a climate control system associated with the scroll compressor.

13. The method of claim 10, further comprising:
determining, with the controller, a difference between the actual discharge temperature and the predicted discharge temperature in response to the actual discharge temperature being greater than the predicted discharge temperature;
comparing, with the controller, the difference with a predetermined threshold; and
determining, with the controller, that the unloading of the scroll compression mechanism is radial unloading of the scroll compression mechanism in response to the difference being greater than the predetermined threshold and the speed of the scroll compressor being less than the speed threshold.

14. The method of claim 13, wherein the controller performs the remediating action and wherein the remediating action includes increasing the speed of the scroll compressor.

15. The method of claim 10, further comprising:
determining, with the controller, a saturated condensing temperature of a condenser of a climate control system associated with the scroll compressor;
determining, with the controller, a saturated evaporating temperature of an evaporator of the climate control system associated with the scroll compressor; and
determining, with the controller, the predicted discharge temperature of the scroll compressor based on the saturated condensing temperature and the saturated evaporating temperature.

16. The method of claim 15, wherein the controller uses a model of the scroll compressor to determine the predicted discharge temperature of the scroll compressor, the model of the scroll compressor including a polynomial equation used by the controller to calculate the predicted discharge temperature based on the saturated condensing temperature and the saturated evaporating temperature.

17. The method of claim 16, further comprising determining, with the controller, a suction superheat of refrigerant entering the scroll compressor and wherein the controller additionally determines the predicted discharge temperature of the scroll compressor based on the suction superheat.

18. The method of claim 10, wherein the controller generates the alert and outputs the alert to at least one of a system controller in communication with the controller, a thermostat in communication with the controller, and a graphical display.

* * * * *